United States Patent
Kim et al.

(10) Patent No.: US 9,534,806 B2
(45) Date of Patent: Jan. 3, 2017

(54) CONTROLLER FOR A CHILLER AND A METHOD FOR CONTROLLING A CHILLER

(71) Applicant: LG ELECTRONICS INC., Seoul (KR)

(72) Inventors: Seontaek Kim, Seoul (KR); Nakhoon Kim, Seoul (KR); Kyooho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/736,892

(22) Filed: Jun. 11, 2015

(65) Prior Publication Data

US 2016/0102881 A1    Apr. 14, 2016

(30) Foreign Application Priority Data

Oct. 13, 2014    (KR) .................. 10-2014-0137745

(51) Int. Cl.
*F24F 11/00*    (2006.01)
*F24F 3/06*    (2006.01)
(Continued)

(52) U.S. Cl.
CPC ............... *F24F 11/008* (2013.01); *F24F 3/06* (2013.01); *F24F 11/0086* (2013.01);
(Continued)

(58) Field of Classification Search
CPC ........ F24F 11/008; F24F 11/0086; F24F 3/06; F24F 2011/0091; F24F 2011/0068; G05B 19/409; G05B 19/042; G05B 2219/2614; G05B 2219/23169; G05B 2219/23178; G05B 2219/23067
See application file for complete search history.

(56) References Cited

U.S. PATENT DOCUMENTS 5,651,264 A * 7/1997 Lo ........................... F24F 3/065
                                                                165/218
6,434,960 B1 * 8/2002 Rousseau ............... F25B 1/047
                                                                62/228.4
(Continued)

FOREIGN PATENT DOCUMENTS

EP    2 309 200    4/2011
EP    2 730 852    5/2014
(Continued)

OTHER PUBLICATIONS

European Search Report dated Mar. 8, 2016. (15165879.6-1807).
(Continued)

*Primary Examiner* — Ramesh Patel
(74) *Attorney, Agent, or Firm* — Ked & Associates LLP

(57) ABSTRACT

A controller for a chiller and a method for controlling a chiller are provided. The method may include receiving, by a controller, a target value of a control factor of the chiller; comparing, by the controller, the received target value with a current value of the control factor of the chiller; transmitting, by the controller, a control factor value change command to the chiller if the received target value is not equal to the current value of the control factor of the chiller; receiving, by the controller, a changed current value of the control factor from the chiller; updating, by the controller, the current value of the control factor on a management screen with the received changed current value of the control factor; and comparing, by the controller, the received target value with the current value of the control factor again.

13 Claims, 7 Drawing Sheets

(51) Int. Cl.
  *G05B 19/042*  (2006.01)
  *G05B 19/409*  (2006.01)
(52) U.S. Cl.
  CPC ........ *G05B 19/042* (2013.01); *G05B 19/409*
    (2013.01); *F24F 2011/0068* (2013.01); *F24F*
    *2011/0091* (2013.01); *G05B 2219/23067*
    (2013.01); *G05B 2219/23169* (2013.01); *G05B*
    *2219/23178* (2013.01); *G05B 2219/2614*
    (2013.01)

(56) References Cited

U.S. PATENT DOCUMENTS

| | | |
|---|---|---|
| 2008/0190366 A1 | 8/2008 | Mauchle et al. |
| 2009/0171512 A1* | 7/2009 | Duncan ................ F24F 5/0035 |
| | | 700/300 |
| 2010/0083110 A1 | 4/2010 | Scott et al. |
| 2010/0223940 A1* | 9/2010 | Kotani .................... F25B 45/00 |
| | | 62/149 |
| 2010/0245259 A1 | 9/2010 | Bairagi et al. |
| 2011/0283718 A1* | 11/2011 | Ueda ...................... F25B 1/053 |
| | | 62/79 |
| 2012/0174609 A1* | 7/2012 | Matsuo ................. F24F 11/006 |
| | | 62/190 |
| 2013/0031920 A1* | 2/2013 | Togano ................... F25B 1/053 |
| | | 62/115 |

FOREIGN PATENT DOCUMENTS

| | | |
|---|---|---|
| JP | 3004607 | 11/1994 |
| KR | 10-2006-0096627 A | 9/2006 |
| KR | 10-0672315 B1 | 1/2007 |
| KR | 10-2012-0019279 A | 3/2012 |
| KR | 10-2012-0020964 A | 3/2012 |
| KR | 10-2013-0038560 | 4/2013 |
| KR | 10-2014-0046713 | 4/2014 |
| KR | 10-2014-0061581 A | 5/2014 |

OTHER PUBLICATIONS

European Search Report dated Mar. 8, 2016. (15166383.8-1807).
Korean Office Action dated Mar. 28, 2016.
Korean Office Action issued in Application No. 10-2014-0137745 dated Sep. 4, 2015.
Korean Office Action dated Sep. 4, 2015.

* cited by examiner

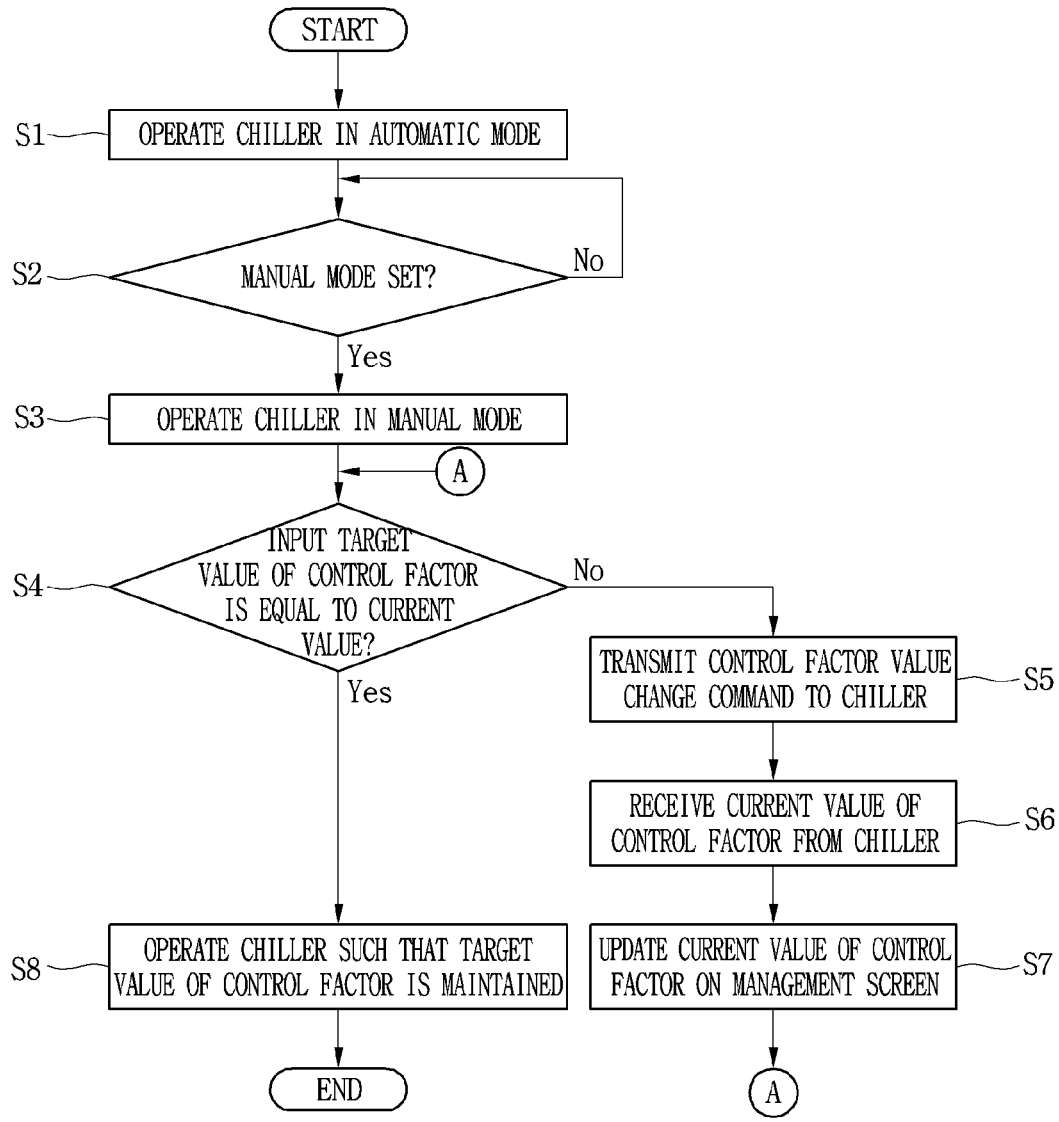

| ECO VALVE TARGET | 62.0 |
| --- | --- |
| CON VALVE TARGET | 63.0 |
| GUIDE VANE | 80 |
| DIFFUSER VANE | 61 |
| HOT GAS | 50 |
| HOT GAS2 | 510 |

CONTROLLER FOR A CHILLER AND A METHOD FOR CONTROLLING A CHILLER

CROSS-REFERENCE TO RELATED APPLICATION(S)

The present application claims priority under 35 U.S.C. 119 and 35 U.S.C. 365 to Korean Patent Application No. 10-2014-0137745, filed in Korea on Oct. 13, 2014, which is hereby incorporated by reference in its entirety.

BACKGROUND

1. Field

A controller for a chiller and a method for controlling a chiller are disclosed herein.

2. Background

In general, controllers are devices for controlling home appliances, such as a TV, an audio, or video device, an air conditioner, a wire broadcast converter, a satellite broadcast converter, or a fan, for example. In some cases, the controllers may remotely control various home appliances through wired communication or wireless transmission of a control frequency signal. The controllers may be devices dedicated to specific home appliances or may be computers in which software for controlling specific home appliances is installed.

A controller may control a chiller, which is a type of air conditioner. The chiller which supplies cold water to a cold water demander may include a compressor, a condenser, an expansion mechanism, and an evaporator, through which a refrigerant may be circulated. The chiller may allow heat exchange between a refrigerant and water by virtue of a water/refrigerant heat exchanger included in the evaporator, and the chiller may be connected to the cold water demander through a water pipe so that water cooled by the refrigerant may be circulated through the cold water demander.

Korean Patent Application Laid-open Publication No. 10-2012-0019279, published on Mar. 6, 2012, which is hereby incorporated by reference, discloses a demand control system for a chiller and a method for controlling the same.

BRIEF DESCRIPTION OF THE DRAWINGS

Embodiments will be described in detail with reference to the following drawings in which like reference numerals refer to like elements, and wherein:

FIG. 5 is a flowchart of a method of controlling a chiller according to an embodiment.

DETAILED DESCRIPTION

Figure 1:
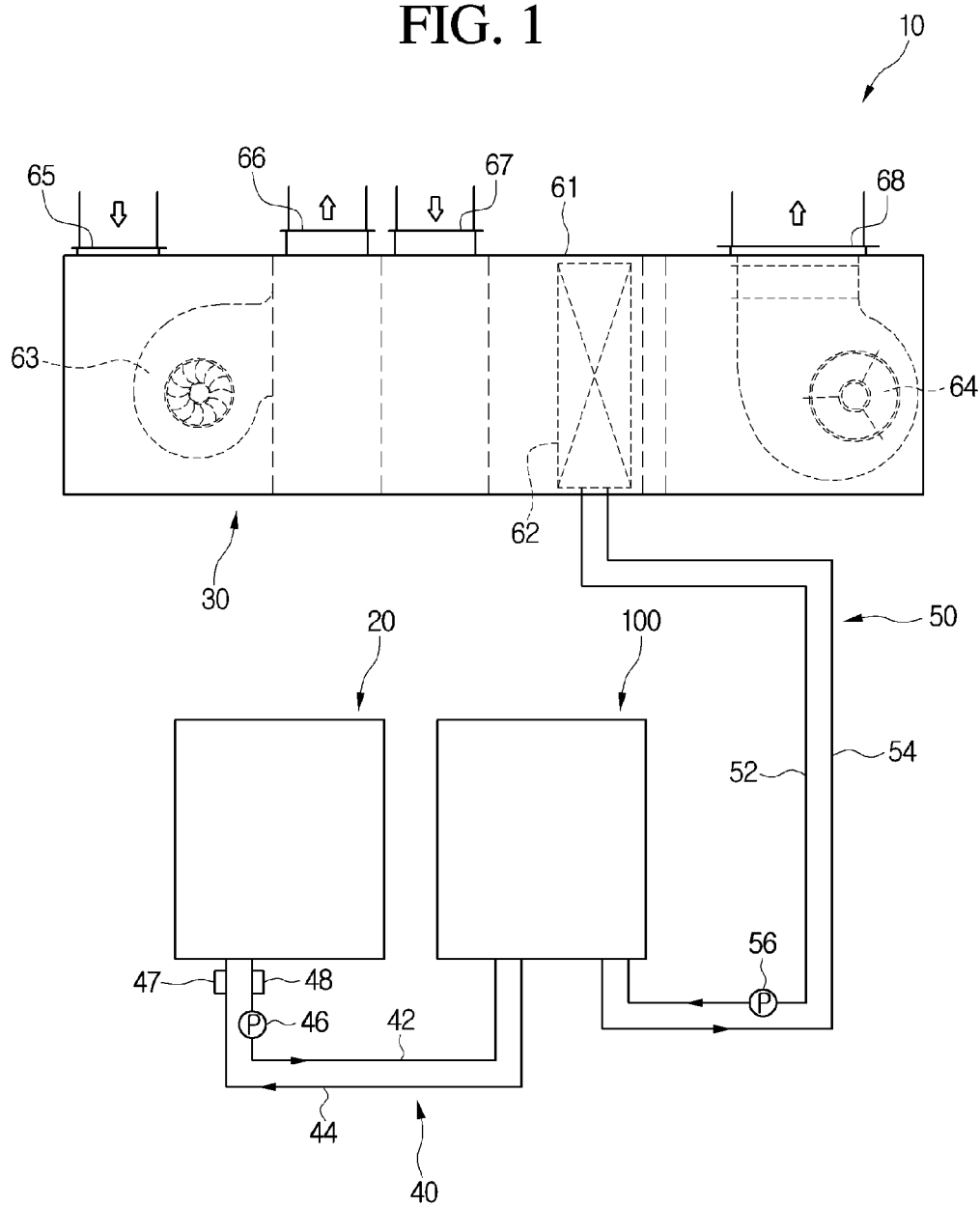
FIG. 1 is a schematic diagram of a chiller system, which is a type of air conditioner, according to an embodiment.

Reference will now be made in detail to embodiments, examples of which are illustrated in the accompanying drawings. Wherever possible, like reference numerals have been used to indicate like elements, and repetitive disclosure has been omitted.

In the following detailed description of embodiments, reference is made to the accompanying drawings that form a part hereof, and in which is shown by way of illustration specific embodiments which may be practiced. These embodiments are described in sufficient detail to enable those skilled in the art to practice the embodiments, and it is understood that other embodiments may be utilized and that logical structural, mechanical, electrical, and chemical changes may be made without departing from the spirit or scope. To avoid detail not necessary to enable those skilled in the art to practice the embodiments, the description may omit certain information known to those skilled in the art. The following detailed description is, therefore, not to be taken in a limiting sense.

Also, in the description of embodiments, terms such as first, second, A, B, (a), (b) or the like may be used herein when describing components. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

Figure 2:
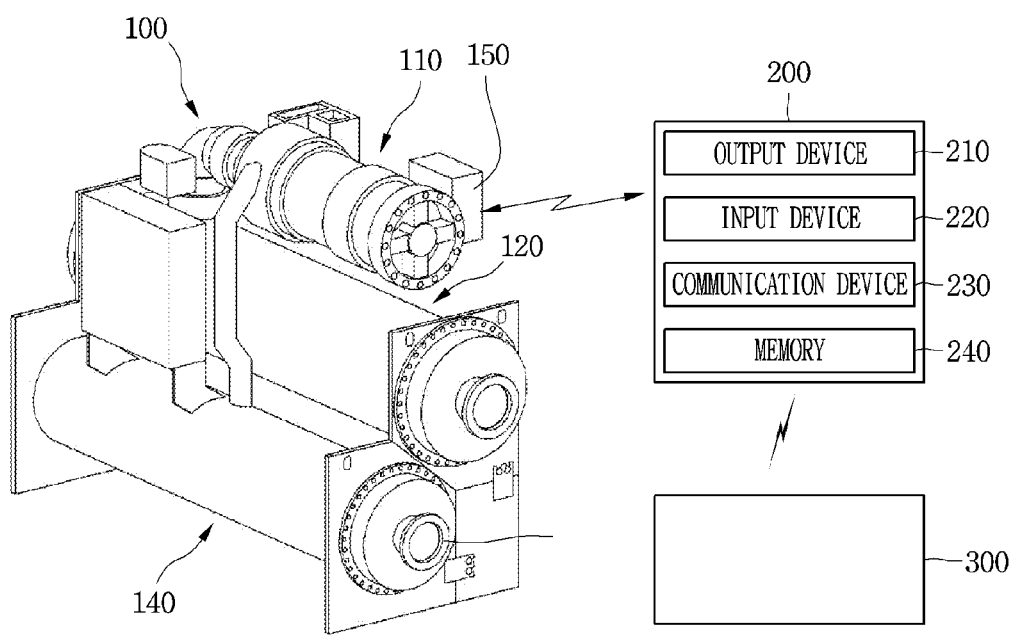
FIG. 2 is a schematic diagram of a chiller and a controller according to an embodiment.

FIG. 1 is a schematic diagram illustrating a chiller system, which is a type of air conditioner, according to an embodiment. FIG. 2 is a schematic diagram illustrating a chiller and a controller according to an embodiment.

Referring to FIGS. 1 and 2, a chiller system 10, which is a type of air conditioner according to an embodiment may include a chiller 100 for which a refrigeration cycle may be established, a cooling tower 20 that supplies cooling water to the chiller 100, and a cold water demander 30 in which cold water that exchanges heat with the chiller 100 may be circulated. The cold water demander 30 may be a device or a space that performs or in which an air conditioning operation is performed using cold water.

A cooling water circulation passage 40 may be provided between the chiller 100 and the cooling tower 20. The cooling water circulation passage 40 may be a pipe that guides cooling water so that the cooling water circulates through the cooling tower 20 and a condenser 120 of the chiller 100.

The cooling water circulation passage 40 may include a cooling water inflow passage 42 that guides cooling water so that the cooling water flows into the condenser 120, and a cooling water outflow passage 44 that guides the cooling water so that the cooling water heated by the condenser 120 flows to the cooling tower 20. A cooling water pump 46 that pumps cooling water may be provided on at least one of the cooling water inflow passage 42 or the cooling water outflow passage 44. FIG. 1 exemplarily illustrates the cooling water pump 46 is provided on the cooling water inflow passage 42.

The cooling water outflow passage 44 may be provided with an outflow water temperature sensor 47 that senses a temperature of cooling water that flows into the cooling tower 20. The cooling water inflow passage 42 may be provided with an inflow water temperature sensor 48 that senses a temperature of cooling water discharged from the cooling tower 20.

A cold water circulation passage 50 may be provided between the chiller 100 and the cold water demander 30. The cold water circulation passage 50 may be a pipe that guides cold water so that the cold water circulates through the cold water demander 30 and an evaporator 140 of the chiller 100.

The cold water circulation passage 50 may include a cold water inflow passage 52 that guides cold water so that the cold water flows into the evaporator 140, and a cold water outflow passage 54 that guides the cold water so that the cold water cooled by the evaporator 140 flows to the cold water demander 30. A cold water pump 56 that pumps cold water may be provided to at least one of the cold water inflow passage 52 or the cold water outflow passage 54. FIG. 1 exemplarily illustrates that the cold water pump 56 is provided on the cold water inflow passage 52.

The cold water demander 30 may be a water-cooled air conditioner that allows heat exchange between air and cold water. For example, the cold water demander 30 may include at least one of an air handling unit (AHU) that mixes indoor air and outdoor air and induces heat change between the mixed air and cold water to discharge the mixed air into an indoor space, a fan coil unit (FCU) installed in an indoor area to induce heat change between the indoor air and the cold water and then discharge the indoor air into the indoor space, and a bottom piping unit laid at a bottom of the indoor area.

FIG. 1 exemplarily illustrates that the cold water demander 30 as the air handling unit. In detail, the air handling unit may include a casing 61, a cold water coil 62 installed inside the casing 61 to allow cold water to pass therethrough, and ventilators 63 and 64 provided to or at both sides of the cold water coil 62 to suction indoor air and outdoor air and blow the suctioned air into an indoor space. The ventilators may include a first ventilator 63 that suctions the indoor air and the outdoor air into the casing 61, and a second ventilator 64 that exhausts conditioned air out of the casing 61.

An indoor air suctioning part or portion 65, an indoor air exhausting part or portion 66, an outside air suctioning part or portion 67, and a conditioned air exhausting part or portion 68 are formed in the casing 61. When the ventilators 63 and 64 are driven, a portion of air suctioned through the indoor air suctioning part 65 may be exhausted through the indoor exhausting part 66, and the remaining air not exhausted through the indoor air exhausting part 66 may be mixed with outdoor air suctioned through the outside air suctioning part 67 so that the mixed air exchanges heat with the cold water coil 62. Further, the mixed air heat-exchanged (cooled) with the cold air coil 62 may be discharged into the indoor area through the conditioned air exhausting part 68.

The chiller 100 may include a compressor 110 that compresses a refrigerant, the condenser 120 into which a high-temperature and high-pressure refrigerant compressed by the compressor 110 flows, an expansion unit or device (not shown) that decompresses the refrigerant condensed by the condenser 120, and the evaporator 140 that evaporates the refrigerant decompressed by the expansion unit. The cooling water circulation passage 40 may be connected to the condenser 120, and the cold water circulation passage 50 may be connected to the evaporator 140.

In the embodiments disclosed herein, as the chiller 100 may be implemented using a known chiller structure, a detailed description of the chiller 100 has been omitted.

The chiller 100 may be connected to a control panel 150 that controls and monitors the chiller 100. The control panel 150 may communicate with the chiller 100. The control panel 150 may be installed at one side of the chiller 100.

The control panel 150 may communicate with a controller 200. The controller 200 may remotely transmit a control command to the control panel 150.

The controller 200 may communicate with the control panel 150 wirelessly or by wire. Hereinafter, communication between the controller 200 and the chiller 100 may be construed as communication between the controller 200 and the control panel 150.

The controller 200 may communicate with an additional chiller 300, and may control or monitor the additional chiller 300. A type of the additional chiller 300 may be the same as or different from that of the chiller 100.

For example, a chiller may be classified into multiple categories. For example, a category of the chiller 100 may include an absorption-type chiller, a turbo-type chiller, or a screw-type chiller, for example.

The chiller types may be information classified according to an operation scheme or a structure within a same category. For example, in a case of the turbo-type chiller, product types thereof may be classified according to a number of compressors, in a case of the screw-type chiller, product types thereof may be classified into an air cooling type or a water cooling type, and, in a case of the absorption-type chiller, product types thereof may be classified according to a temperature of steam or whether steam is generated.

The controller 200 may communicate with the multiple chillers 100 and 300 of a same type belonging to a same category. The controller 200 may communicate with the multiple chillers 100 and 300 of different types belonging to the same category. The controller 200 may communicate with the multiple chillers 100 and 300 belonging to different categories.

The controller 200 may communicate with each control panel 150 on the basis of a Modbus protocol. In the case in which the controller 200 controls the multiple chillers 100 and 300 of different types, the controller 200 may determine protocols corresponding to the types of the chillers 100 and 300 and may communicate with the chillers 100 and 300 on the basis of the determined protocols.

The controller 200 may include an output device or output 210 that outputs information, and an input device or input 220 that receives information. The output device 210 may include a sound output unit or output that outputs a sound or a display unit or display that emits light to present a visual indication. In detail, the display unit may include at least one of a light emitting polymer display (LPD), a liquid crystal display (LCD), a thin-film transistor liquid crystal display (TFT LCD), an organic light-emitting diode (OLED), a flexible display, or a 3D display, for example; however, embodiments are not limited thereto.

The output device 210 may display information on a subject to which the controller 200 is connected. That is, the controller 200 may display information on the chiller 100, for example.

The output device 210 may include a touch screen. In this case, the output device 210 may be integrated with the input device 220. The touch screen may display a visual output to a user, and may receive an input from the user on the basis of a tactile contact. The visual output may include a graphic, a text, an icon, a video, or a combination thereof, for example. In a case in which the output device 210 includes the touch screen, each button on the input device 220 may be replaced with a user interface displayed on the touch screen. That is, the input device 220 may not be provided.

The controller 200 may include a communication device 230. The communication device 230 may receive information from the chiller 100, and may transmit a control command to the chiller 100.

In a case in which the communication device 230 communicates with the chiller 100, the communication device 230 may include a radio frequency (RF) circuit. The communication device 230 may transmit/receive an RF signal which is an electromagnetic signal. The RF signal may convert an electric signal into an electromagnetic signal and vice versa, and may communicate with a communication network and other communication devices using the electromagnetic signal.

For example, the RF circuit may include an antenna system, an RF transceiver, at least one amplifier, a tuner, at least one oscillator, a digital signal processor, a CODEC chipset, and a memory, for example; however, embodiments are not limited thereto and may include known circuits to perform functions of the foregoing elements. Alternatively, the communication device 230 may be based on at least one of wireless communication technologies, such as Bluetooth, radio frequency identification (RFID), infrared data association (IrDA), ultra wideband (UWB), ZigBee, or Wi-Fi, for example.

The controller 200 may include a memory 240 that stores information received from the chillers 100 and 300, and a processor that controls the output device 210. Further, the memory 240 may store layout information for configuring a screen to be displayed on the output device 210 and a list of information to be displayed for each chiller.

Figure 3:
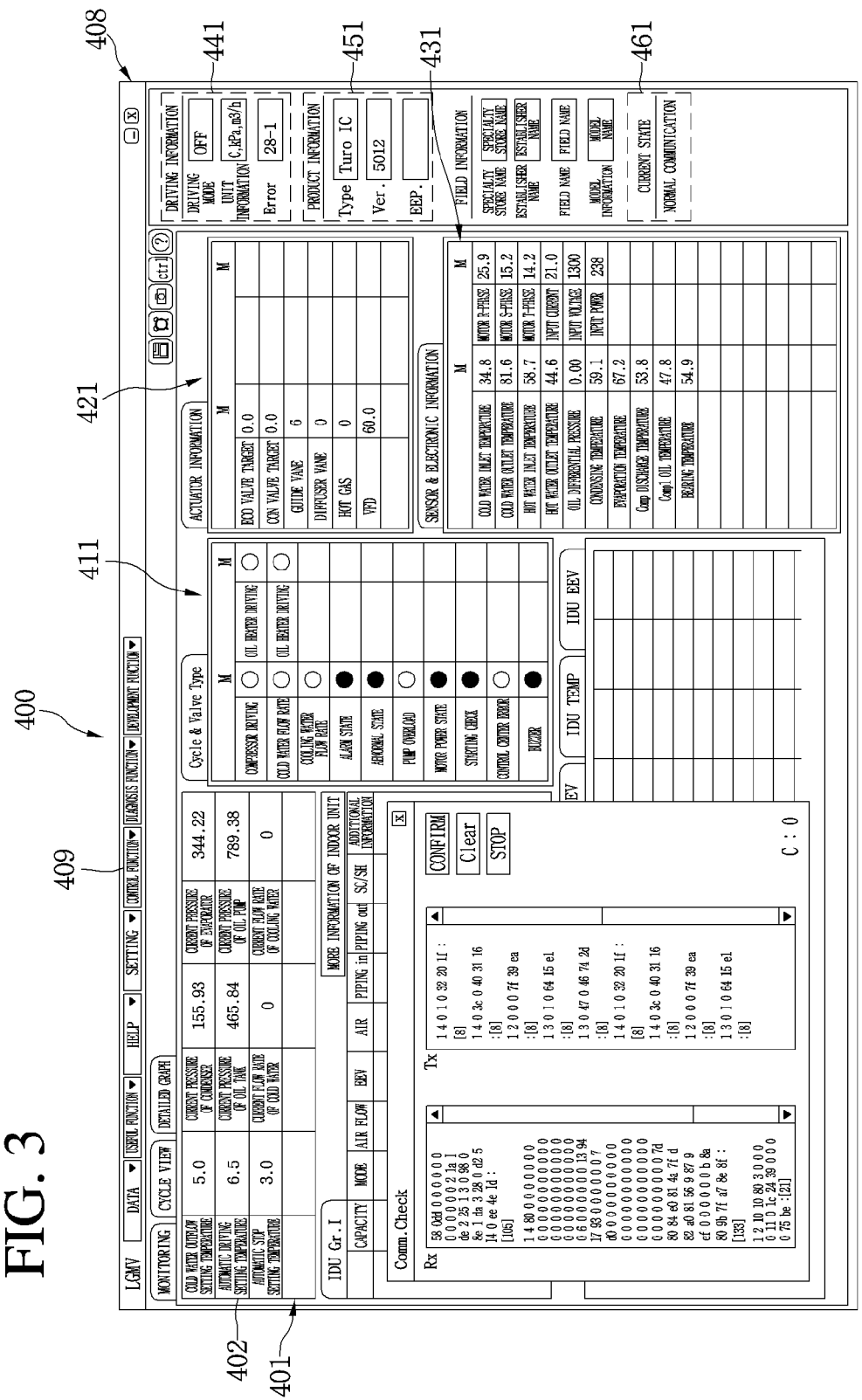
FIG. 3 is a view illustrating a management screen displayed on an output device according to an embodiment.

FIG. 3 is a view illustrating a management screen displayed on an output device according to an embodiment. Referring to FIG. 3, the output device 210 may display a management screen 400 corresponding to the chiller 100 selected. That is, chillers of the same types or different types may be selected using the input device 220, and the output device 210 may display the management screen 400 corresponding to the chiller 100 selected.

The management screen 400 may display, on a single screen, various information received from the chiller 100. For example, the management screen 400 may display product information, state information, and/or a communication state, for example, of the chiller 100.

The management screen 400 may include a menu region 408. The menu region 408 may display a menu button to select a plurality of menus. The menu button may be selected by a touch of a user or using the input device 200. The menu button may include, for example, a control function button 409 to set a control type. The user may select an automatic mode or a manual mode of the chiller 100 by selecting the control function button 409.

The management screen 400 may include a first information display region 401 to display main information related to operation of the chiller 100. Further, the management screen 400 may include a second information display region 411 to display information on a valve or information on a cycle of the chiller 100. Furthermore, the management screen 400 may include a third information display region 421 to display information on an actuator provided to the chiller 100. Also, the management screen 400 may include a fourth information display region 431 for displaying information on a sensor or electronic information. The management screen 400 may also include a driving information display region 441, a product display region 451, and a communication state display region 461.

In this embodiment, the management screen 400 may display the plurality of information display regions in common regardless of a category or type of a chiller communicatively connected to the controller 200. That is, a layout of the plurality of information display regions on the management screen 400 may be fixed.

The driving information display region 441 may display a driving mode of the chiller, for example, ON or OFF information, or information on units of values displayed on the management screen. The product display region 451 may display product information on the chiller 100 communicatively connected. The information displayed on the product display region 451 may include at least product type information.

The communication state display region 461 may display a state of communication with the chiller 100. For example, in a case in which the controller 200 normally communicates with the chiller 100, the communication state display region 461 may display information indicating normal communication. In contrast, in a case in which an error of communication between the controller 200 and the chiller 100 occurs, the communication state display region 461 may display information indicating a communication error.

The first information display region 401 may display fixed information irrelevant to the category or product type of the chiller, and variable information that varies with the category or product type of the chiller. The fixed information may not be deleted from the first information display region 401 even if the category or product type of the chiller is changed. Although embodiments are not limited thereto, the fixed information of FIG. 3 may be an automatic driving setting temperature and an automatic stop setting temperature.

The variable information may be displayed or may not be displayed on the first information display region 401 according to the category or product type of the chiller. That is, if the type of the chiller communicatively connected is changed, the output device 210 may continuously display the fixed information on the first information display region 401, and may delete or change a part or portion or the entirety or all of the variable information, or may add information thereto.

In this embodiment, a description of the fixed information and the variable information displayed on the first information display region 401 may be applied to the other information display regions 411, 421 and 431. However, both the fixed information and the variable information or the variable information alone may be displayed according to the information display regions 411, 421, and 431.

Each of the information display regions 401, 411, 421, and 431 may be divided into a plurality of display blocks to separately display a plurality of pieces of information. The fixed information or the variable information may be displayed on each display block. A number of the plurality of display blocks may be set to be constant regardless of the category or product type of the chiller, and a fixed number of the plurality of display blocks may be displayed on the management screen. Further, according to the category or type of the chiller, the fixed information or the variable information may be displayed on some or a portion of the plurality of display blocks, or the fixed information and the variable information may be displayed on all of the plurality of display blocks.

For example, the first information display region 401 may be divided into 12 display blocks, and information may be displayed on some or all of the 12 display blocks. FIG. 3 exemplarily illustrates that information is displayed on 9 display blocks out of 12 display blocks.

Figure 4:
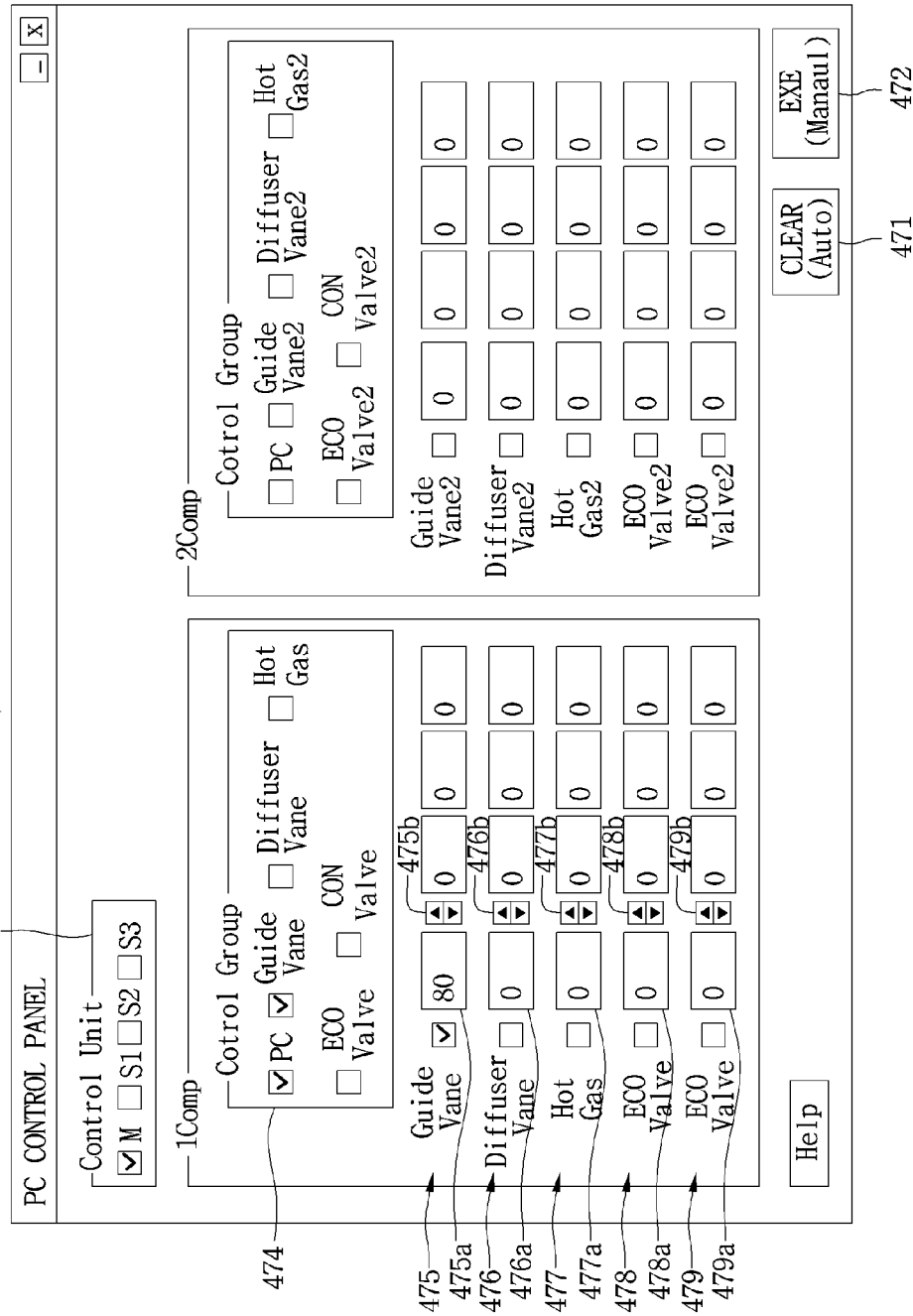
FIG. 4 is a view illustrating a control screen according to an embodiment.

FIG. 4 is a view illustrating a control screen according to an embodiment. Referring to FIGS. 3 and 4, when the control function button 409 is selected from the management screen 400, the output device 210 may display a control screen 470. The control screen 470 may pop up on the management screen 400, or the management screen 400 may be switched to the control screen 470.

The control screen 470 may display an automatic button 471 to select an automatic mode and a manual button 472 to select a manual mode. In the automatic mode, the chiller 100 may be operated so as to maintain control factor values stored in the memory 240 without a control command from the user. In the manual mode, the chiller 100 may be operated so as to satisfy a control factor target value input by the user.

The control screen 470 may display a control subject selection unit or selector 473 to select a chiller to be controlled. FIG. 4 exemplarily illustrates the control subject selection unit 473 to select one of four chillers. The control screen 470 may display a control factor selection unit or selector 474 for selection of a control factor of a selected chiller.

A control factor selectable by the control factor selection unit 474, to which embodiments are not limited, may include an opening degree of a guide vane of a compressor, an opening degree of a diffuser vane, hot gas, and a valve, for example. The opening degree of the guide vane will be described in detail hereinbelow.

The control screen 470 may display a plurality of control factors 475-479. The plurality of control factors 475-479 may be arranged vertically or horizontally. The control screen 470 may display target value display parts or displays 475a to 479a for respective control factors and a target value input part or input 475b-479b.

The control screen 470 may display the target value display part and the target value input part for each control factor, and activate the target value display part and the target value input part of a control factor selected by the control factor selection part, but deactivate the target value display part and the target value input part of a control factor not selected. This is to prevent a target value for a non-selected control factor from being unintentionally changed.

For example, when a guide vane is selected from the control factor selection unit 474, the target value display part 475 and the target value input part 475a corresponding to the guide vane may be activated. If the user selects a control factor, inputs a target value, and selects the manual button 472, the manual mode may be selected. If the automatic button 471 is selected after the control factor is selected and the target value is input, the target value display parts 475a to 479a and the target value input parts 475b-479b for all control factors 475-479 may be deactivated.

Alternatively, if the automatic button 471 is selected after the control factor is selected and the target value is input, the control screen 470 may disappear or may be switched to the management screen 400 of FIG. 3. As another example, if the user selects the manual button 472, the manual mode may be selected so that the control subject selection unit 473 and the control factor selection unit 474 may be activated. Further, the user may select a control subject and may select a control factor to input a target value of the control factor.

FIG. 5 is a flowchart of a method of controlling a chiller according to an embodiment. FIGS. 6A-6D are views illustrating a change in a value of a control factor on a management screen when a controller transmits a control command to the chiller and receives a current value of the control factor.

In FIGS. 6A-6D, the left-sides illustrate the target value display part and the right-sides illustrate current values of control factors. Referring to FIGS. 5 and 6A-6D, when an operation start command for the chiller 100 is input, the chiller 100 may start to operate. The chiller 100 may be operated in the automatic mode, for example, in step or operation S1.

The controller 200 may determine whether the manual mode is set while the chiller 100 is operated in the automatic mode, in step or operation S2. As a method of setting the manual mode is described in detail above, a detailed description of the manual mode has been omitted.

As described above, before the manual mode is set or after the manual mode is set, a target vale for a control factor may be input by a user. Further, the controller 200 may receive, from the chiller 100, current state information of the chiller 100.

If it is determined that the manual mode is set in step or operation S2, the controller 200 may control the chiller 100 so that the chiller 100 is operated in the manual mode, in step or operation S3. Further, the controller 200 may determine whether the input target value of the control factor is equal to a current value thereof, in step or operation S4. If it is determined that the input target value of the control factor is not equal to the current value in step or operation S4, the controller 200 may transmit a command to change the value of the control factor to the chiller 100, in step or operation S5. Then, the chiller 100 may change the current value of the control factor. The controller 200 may receive a changed current value of the control factor from the chiller 100. Further, the current value of the control factor on the management screen 400 may be updated so that the received current value of the control factor may be displayed on the management screen 400, in step or operation S7.

Next, the process may return to step or operation S4, so that the controller 200 may determine whether the input target value for the control factor is equal to the current value thereof, in step or operation S4.

Figure 6A:
FIGS. 6A-6D are views illustrating a change in a value of a control factor on a management screen when a controller transmits a control command to the chiller and receives a current value of the control factor.
Figure 6B:

Referring to FIG. 6A, the target value of the opening degree of the guide vane input by the user may be, for example, 80, and a value of the opening degree of the guide vane of the compressor may be 74 at an initial time of setting the manual mode. In this case, the controller 200 may transmit an opening degree increase command to the chiller 100 (corresponding to step or operation S5 of FIG. 5). A unit of an increase/decrease of the opening degree of the guide vane may be, for example, 2 (reference unit). That is, the opening degree of the guide vane of the chiller may be increased or decreased by as much as 2. Therefore, the controller 200 may transmit, to the chiller 100, a command to increase the opening degree by as much as 2.

The chiller 100 that has received the opening degree increase command may increase the opening degree of the guide vane by as much as 2, and then may notify the controller 200 that the current value of the opening degree of the guide vane is 76 (corresponding to step or operation S6 of FIG. 5). Then, the controller 200 may update the opening degree of the guide vane on the management screen 400 with a received opening degree of the guide vane. Therefore, the management screen 400 may display that the opening degree of the guide vane is 76 (corresponding to step or operation S7 of FIG. 5) (see FIG. 6B).

Further, the controller 200 may determine again whether the input target value of the control factor is equal to the current value thereof. If it is determined that the target value of the control factor is not equal to the current value, the controller 200 may transmit the opening degree increase command to the chiller 100 again. That is, the controller 200 may iteratively perform steps or operations S5 to S7 of FIG. 5 until the target value of the control factor becomes equal to the current value.

Figure 6C:
Figure 6D:

Therefore, as illustrated in FIGS. 6C and 6D, the current value of the guide vane on the management screen 400 may be changed to 78 and 80 (changed by as much as the reference unit). That is, the chiller 100 may be controlled so that the input target value of the control factor is automatically followed.

Meanwhile, if it is determined that the input target value of the control factor is equal to the current value thereof, the controller 200 may terminate a control operation. Therefore, the chiller 100 may be operated so that the control factor maintains the target value, in step or operation S8. That is, the chiller 100 may be operated while the opening degree of the guide vane of the compressor is maintained as 80.

In this embodiment, if the opening degree of the guide vane becomes larger than 80 due to an operation error of the guide vane, the controller 200 may transmit an opening degree decrease command to the chiller 100.

According to this embodiment, a user may remotely input a control command through a control panel to monitor a state of the chiller without approaching the chiller on which a control panel is installed, so that a convenience of the user may be improved. Further, as the chiller is operated not only in the automatic mode but also in the manual mode, a user may set a control factor as a desired target value so as to control the chiller. That is, as the user may individually select various components of the chiller, such as a valve or an actuator, to set the target value, the chiller may be accurately operated as intended by the user.

Embodiments disclosed herein provide a controller for a chiller and a method for controlling a chiller.

Embodiments disclosed herein provide a method for controlling a chiller that may include includes receiving, by a controller, a target value of a control factor of the chiller; comparing, by the controller, an input target value with a current value of the control factor of the chiller; transmitting, by the controller, a control factor value change command to the chiller if the input target value is not equal to the current value of the control factor of the chiller; receiving, by the controller, a changed current value of the control factor from the chiller; updating, by the controller, the current value of the control factor on a management screen with a received current value of the control factor; and comparing, by the controller, the input target value with the current value of the control factor again.

Embodiments disclosed herein further provide a controller for controlling a chiller that may include a communication device configured to communicate with the chiller on a basis of a Modbus protocol, and an output device or output configured to output a management screen for inputting state information of the chiller and a control screen for inputting a control command. A control factor of the chiller may be selected and a target value of the control factor may be input through the control screen. The controller may compare an input target value with a current value of the control factor, transmit a control factor value change command to the chiller if the input target value is not equal to the current value of the control factor of the chiller, receive a changed current value of the control factor from the chiller, and repeatedly transmits the control factor value change command to the chiller until the input target value becomes equal to the current value of the control factor of the chiller.

Furthermore, as the user may input the command for changing the target value of the control factor after setting the manual mode through the controller and may receive the current value of the control factor fed back from the chiller, the user may remotely determine whether the chiller is operated normally. That is, the chiller may be diagnosed remotely.

The details of one or more embodiments are set forth in the accompanying drawings and the description. Other features will be apparent from the description and drawings, and from the claims.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a chiller, the method comprising:
   receiving, by a controller, a target value of a control factor of the chiller;
   comparing, by the controller, the received target value with a current value of the control factor of the chiller;
   transmitting, by the controller, a control factor value change command to the chiller if the received target value is not equal to the current value of the control factor of the chiller;
   receiving, by the controller, a changed current value of the control factor from the chiller;
   updating, by the controller, the current value of the control factor on a management screen with the received changed current value of the control factor; and
   comparing, by the controller, the received target value with the current value of the control factor again, wherein the controller iteratively performs the transmitting the control factor value change command, the receiving the changed current value of the control factor, the updating the current value of the control factor on the management screen, and the comparing the received target value with the current value of the control factor again until the received target value becomes equal to the current value of the control factor of the chiller, if the received target value is not equal to the current value of the control factor of the chiller as a result of the comparing, by the controller, the received target value with the current value of the control factor of the chiller again.

2. The method according to claim 1, wherein the controller controls the chiller to operate in an automatic mode or a manual mode, and receives the target value of the control factor of the chiller before or after the manual mode of the chiller is selected.

3. The method according to claim 2, wherein the controller controls an output so that the output displays a control screen to receive a selection of the manual mode or the automatic mode of the chiller.

4. The method according to claim 3, wherein the control screen displays a manual button to receive the selection of the manual mode of the chiller and an automatic button to receive the selection of the automatic mode of the chiller.

5. The method according to claim 4, wherein the control screen further displays a control subject selector to receive a selection of a chiller type and a control factor selector to receive a selection of the control factor of the selected chiller type.

6. The method according to claim 5, wherein the control screen further displays a target value display and a target value input for each of a plurality of control factors.

7. The method according to claim 6, wherein the target value display and the target value input corresponding to a selected control factor of the plurality of control factors are activated, and the target value display and the target value input corresponding to the non-selected, plurality of control factors are deactivated.

8. The method according to claim 3, wherein the control screen is a pop up screen on the management screen or a switched screen of the management screen.

9. The method according to claim 5, wherein the control factor selector includes an opening degree of a guide vane of a compressor, an opening degree of a diffuser vane, hot gas, and a valve.

10. The method according to claim 1, wherein the chiller is operated so that the current value of the control factor is maintained as the target value, if the received target value is equal to the current value of the control factor as a result of the comparing, by the controller, the received target value with the current value of the control factor again.

11. The method according to claim 1, wherein a value of the control factor displayed on the management screen is changed by as much as a reference unit.

12. The method according to claim 1, wherein the controller communicates with the chiller on a basis of a Modbus protocol.

13. The method according to claim 1, wherein the controller communicates with the chiller wirelessly or by wire.

* * * * *